No. 641,607.  
P. RISSLER & H. BAUER.  
ELECTRICITY METER.  
(Application filed Nov. 18, 1899.)  
Patented Jan. 16, 1900.

(No Model.)

WITNESSES:

INVENTORS.
Paul Rissler
Heinrich Bauer.
BY Richards & Co
ATTORNEYS

UNITED STATES PATENT OFFICE.

PAUL RISSLER AND HEINRICH BAUER, OF FREUDENSTADT, GERMANY.

ELECTRICITY-METER.

SPECIFICATION forming part of Letters Patent No. 641,607, dated January 16, 1900.

Application filed November 18, 1899. Serial No. 737,480. (No model.)

*To all whom it may concern:*

Be it known that we, PAUL RISSLER, watchmaker, and HEINRICH BAUER, electrotechnician, subjects of the Emperor of Germany, and residents of Freudenstadt, Würtemberg, Germany, have invented a certain new and useful Improved Electricity-Meter, of which the following is an exact, full, and clear description.

This invention relates to an electricity-meter in which the index of the ampere-meter is connected to clockwork or mechanism in such a manner that it is continuously returned to the zero-mark at or within equal or uniform periods after it has indicated the intensity of the current, and during this retrograde movement the index is coupled each time with a counting mechanism which adds or totalizes the current intensity consumed in the single throws, oscillations, or strokes of the ampere-meter index and indicates the total sum of the consumed current intensity on a dial-plate.

The novelty of the invention consists in the arrangement by which an entirely accurate and faultless registration is attained by the counting mechanism, which was not possible with such apparatus hitherto in use.

On the accompanying drawings is shown a suitable construction of such an electric meter.

Figure 1:
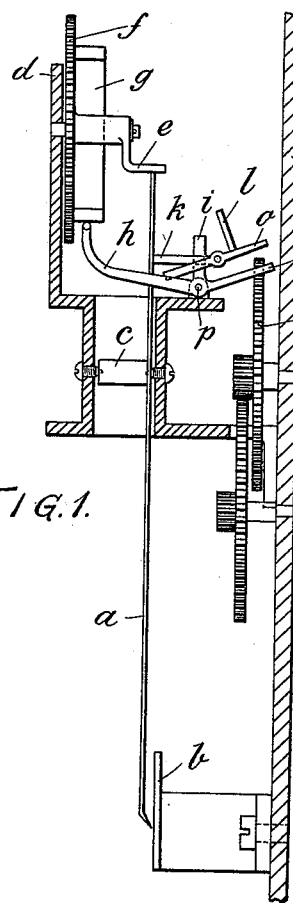
Figure 2:
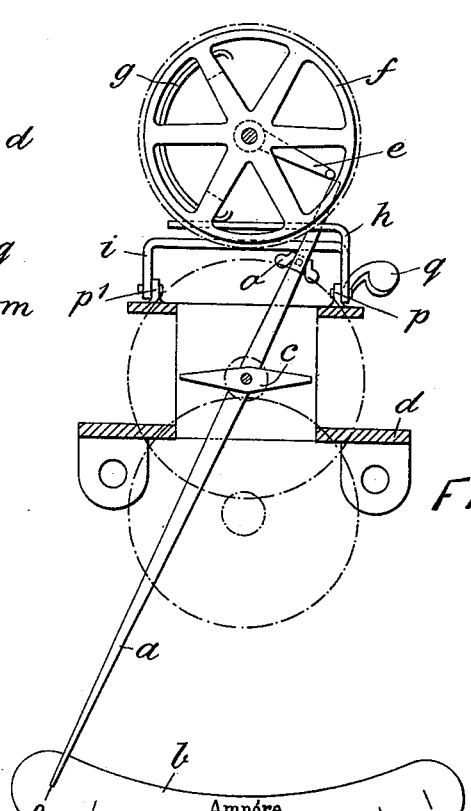
Figure 3:
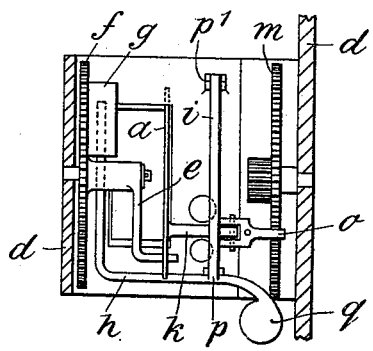

Figure 1 is a side elevation of the interior counting apparatus. Fig. 2 is a front elevation of the same with the ampere-meter indicator at the zero-mark, and Fig. 3 shows the interior of the counting mechanism as seen from above.

The indicator or index $a$, connected to an ordinary galvanometer-coil and having its fulcrum at $c$ in a casing $d$, plays with its lower end in front of a scale $b$, upon which it indicates the current intensity. Above the fulcrum $c$ is located a wheel $f$, uniformly rotated by clock mechanism, and on whose (wheel) axis of rotation a crank $e$ is rigidly connected to the wheel. At every rotation of the wheel the pin of the crank $e$ contacts with the upper end of the index $a$ and returns the latter from its limit of oscillation to the zero-mark of the scale. The wheel $f$ is furthermore provided with a segment-piece $g$, which presses against an upwardly-bent arm $h$ of a scale-beam oscillating on the fulcrum $p$ when it comes in contact therewith. The other arm $q$ of the scale-beam is in form of a balance-weight, so that it is a little heavier than the arm $h$. A bow-piece $i$ is rigidly connected to the scale-beam at its fulcrum $p$ and to a corresponding second fulcrum $p'$. Below this bow-piece $i$ slides the pin $k$, mounted on the index or pointer $a$, such pin carrying on its free end by means of a hinge or the like a vertically-movable double-armed lever $o$, whose arm opposite to the index is constructed like a weight and is somewhat heavier than the other arm. The arm of the lever $o$ which is more distant or remote from the index or pointer $a$ and on which lever a pin $l$ is provided engages, if depressed, into a ratchet-wheel $m$, indirectly actuating the counting apparatus.

The apparatus operates as follows: If current is passed through the galvanometer-coil, the index or pointer $a$ makes a stroke or oscillation. By the crank $e$ of the little wheel $f$ rotating uniformly in a continuous manner the index is returned to the zero-mark at every rotation of the said wheel. The segment $g$ is provided on the wheel $f$ in such a manner that it begins to depress the arm $h$ of the scale-beam at the moment when the crank $e$ releases the index $a$, and the latter commences to perform its new strokes or oscillations again. By this depression of the lever-arm $h$ the bow-piece $i$ is at same time rotated toward the index, so that the lever $o$ may be freely adjusted under the influence of its loaded arm in such a manner that it is not in engagement with the ratchet-wheel $m$. When the index is making a stroke or oscillation, a coupling of the same with the counting mechanism does not take place. During the retrograde movement of the index $a$ to the zero-mark of the scale $b$ the arm $h$ of the scale-beam is, however, free and is raised by the heavier arm $q$. The bow-piece $i$ thereby presses against the pin $l$ of the lever $o$ and causes the latter to engage with the ratchet-wheel $m$, so that a coupling of the index with the wheel $m$ takes place and the latter is rotated during the backward movement or return of the index to the extent of the angle of the stroke.

In view of the fact that the wheel $m$ during each retrograde movement of the index to the zero-mark is correspondingly rotated, whereas during each stroke such wheel remains stationary on the point reached during the last but one retrograde movement, the strokes are registered in sums or totals on a dial-plate.

The mechanism of the present invention operates with greater accuracy and registers faultlessly, since no variations of the index effected by shocks or the like can take place, which could not be avoided with the electricity-meters hitherto in use.

Having now particularly described and ascertained the nature of our said invention and in what manner the same is to be performed, we declare that what we claim, and wish to secure by Letters Patent, is—

1. In combination in an electricity-meter, a pointer or index adapted to be moved in one direction under electrical influence, means for mechanically returning the same and recording means operated on the return stroke of the pointer or index, substantially as described.

2. In combination in an electricity-meter, a pivoted pointer adapted to be moved forward by electrical influence, recording mechanism, means for locking the same during the forward stroke of the pointer and means for mechanically returning the pointer and for releasing the locking means.

3. In combination, a pivoted pointer, recording mechanism including a toothed wheel, a wheel mechanically driven, a pawl normally engaging the toothed wheel and means carried by the mechanically-driven wheel adapted to release the pawl and means adapted to shift the pointer when the pawl is released, substantially as described.

In witness whereof we have hereunto set our hands in presence of two witnesses.

PAUL RISSLER.
HEINRICH BAUER.

Witnesses:
HERMANN WAGNER,
KASPAR HERTER.